July 9, 1968  H. NERWIN  3,391,621
FLASH COUNTER

Filed July 12, 1965  4 Sheets-Sheet 1

HUBERT NERWIN
INVENTOR.

BY R. Frank Smith
Ronald S. Karch
ATTORNEYS

July 9, 1968

H. NERWIN 3,391,621

FLASH COUNTER

Filed July 12, 1965

HUBERT NERWIN
INVENTOR.

BY R. Frank Smith
Ronald S. Kareh
ATTORNEYS

July 9, 1968  H. NERWIN  3,391,621
FLASH COUNTER
Filed July 12, 1965  4 Sheets-Sheet 4
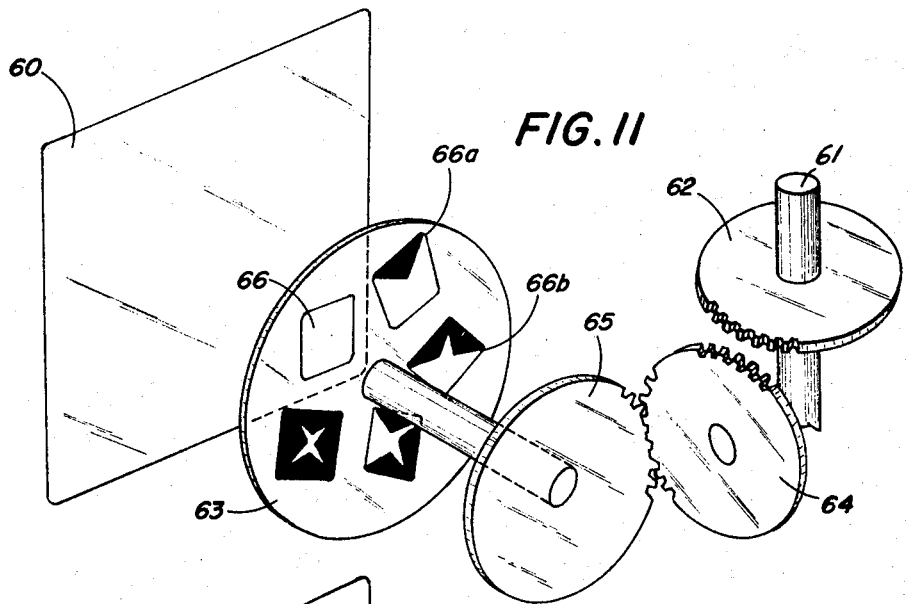
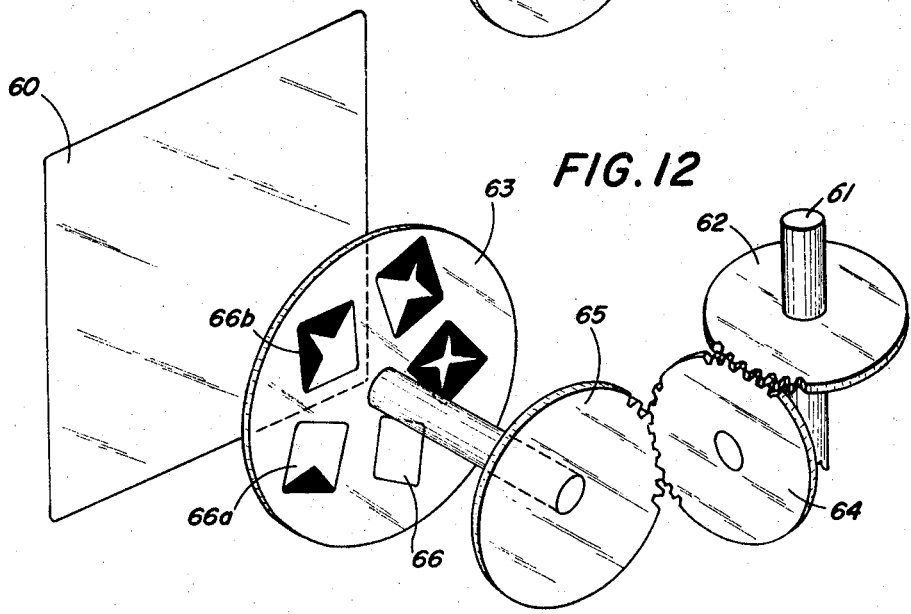
HUBERT NERWIN
INVENTOR.
ATTORNEYS United States Patent Office 3,391,621
Patented July 9, 1968

3,391,621
FLASH COUNTER
Hubert Nerwin, Rochester, N.Y., assignor to Eastman Kodak Company, Rochester, N.Y., a corporation of New Jersey
Filed July 12, 1965, Ser. No. 471,010
8 Claims. (Cl. 95—11)

ABSTRACT OF THE DISCLOSURE

In a camera adapted to receive a multilamp photoflash package, a mechanism for blocking camera operation after the last lamp in the package has been fired. The blocking mechanism may be adapted to prevent further movement of the camera shutter or advancement of the film in response to the firing of a predetermined number of flashlamps in the package. The camera may also be provided with an indicator device to visually indicate in the viewfinder the number of lamps that have been fired.

---

The present invention relates to flash photography, and more particularly, to photographic cameras or devices having flash systems using multilamp photoflash packages.

There have been developed photoflash packages comprising an attaching base and a plurality of photoflash lamps, in which the package is attached to a flash device to sequentially position the flashlamps of the package in a photoflash circuit with sequential operations of a photographic camera. Such a package is disclosed, for example, in U.S. applications Ser. No. 417,913, now Patent No. 3,353,465, and 417,914, now Patent No. 3,327,105, both filed Dec. 14, 1964.

With such multilamp photoflash packages, it is possible to take a number of flash pictures in rapid succession. When taking the rapid number of flash pictures, however, it is likely that an accurate count of the flash pictures taken will not be maintained, and the operator may forget to remove the package when the last photoflash lamp has been fired. If the package is not removed after the firing of the flashlamp, a used flashbulb will be positioned in the lamp circuit for the next operation of the camera, and an exposure may thus be wasted.

My invention overcomes this disadvantage by indicating when the lamps in the package have been used, thereby warning the operator that the package must be removed and a new package inserted if more flash pictures are desired. According to my invention, there may be provided a counting mechanism, initiated when a fresh multilamp package is inserted, to block camera operation after the last lamp in the package has been fired. There may also be provided a signal in the viewfinder to visually indicate the number of lamps that have been fired.

A primary object of my invention, therefore, is to provide a mechanism which will indicate when all the lamps of a photoflash package have been fired.

A further object of my invention is to provide a blocking mechanism which will prevent camera operation after all of the lamps of an inserted package have been fired.

Yet another object of the invention is to provide a blocking mechanism which will be operative only when a flash package has been attached.

Still another object of my invention is to provide a signal which may be visible in a camera viewfinder to indicate the number of flashbulbs of the package that have been fired.

These and other objects and advantages will become more apparent during the course of the following description, the accompanying drawing forming a part thereof, and wherein.

Figure 7:
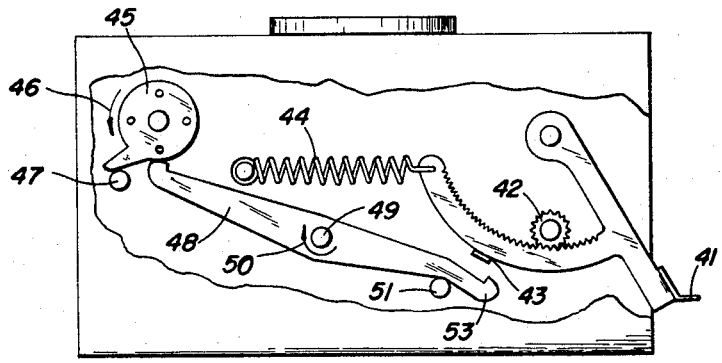
FIG. 7 is a top view of another embodiment of the invention, in which the counting mechanism is operable to block film wind after all of the lamps of the attached package have been fired.
Figure 9:
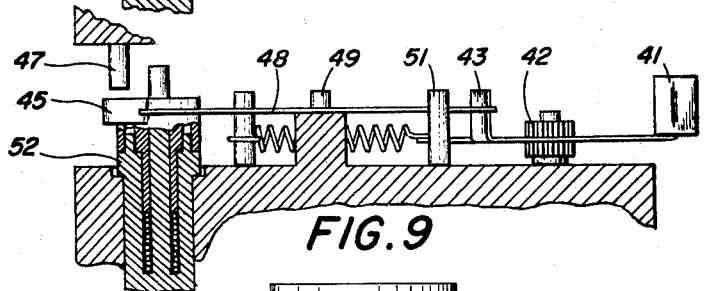
Figure 10:
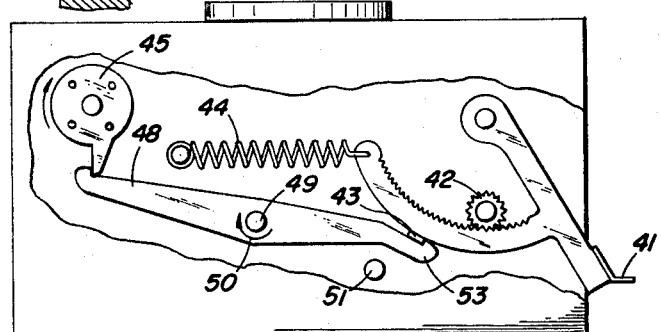

FILG. 8 is a front view of the mechanism of FIG. 7;

FIG. 9 is a front view showing the mechanism of FIG. 7 after a lamp package has been attached;

FIG. 10 is a top view showing the mechanism of FIG. 7 in position to block film wind;

FIG. 11 is a perspective view showing a counting mechanism, visible in the camera viewfinder, to indicate the number of flashlamps which have been fired; and FIG. 12 is a view of the mechanism of FIG. 11 with a lamp package inserted.

A photographic still camera which may be used to embody the present invention is disclosed in U.S. application Ser. No. 458,015, now Patent No. 3,353,467, filed May 24, 1965, in which a flash package containing four flash lamps is attached to a receiving socket, and the socket and attached package are indexed after each camera operation to successively place the lamps in the circuit for the subsequent exposure. In that application, there is disclosed an ejecting pin which is positioned for vertical movement in response to the attachment of a flash package, and the pin is rotated with the socket during the indexing operation.

Utilizing the pin arrangement disclosed in application Ser. No. 458,015, and referring to FIGS. 1 and 2, there is provided a sector gear 1 which is held against a stop 2 by a spring force 3 acting in the counterclockwise direction. A pinion gear 4 is fastened to a socket pin 5, as disclosed in the above application. When a flash package is attached to the receiving socket, the pin 5 is moved downwardly (FIG. 2) until pinion gear 4 engages the gear teeth of sector gear 1.

Figure 1:
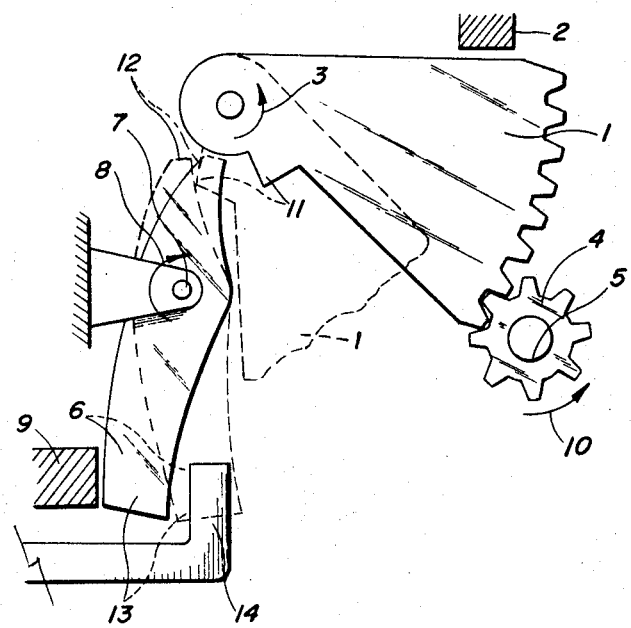
FIG. 1 is an embodiment of a counting mechanism for use in a still camera, operative upon the insertion of a photoflash package and the firing of all of the lamps in the package, to block shutter operation of the camera.
Figure 2:
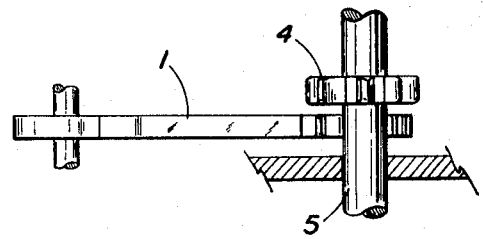
FIG. 2 is a side view of elements of the embodiment shown in FIG. 1.
Figure 3:
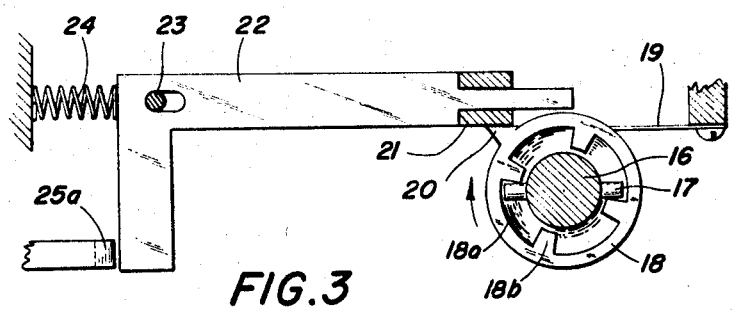
FIG. 3 is a top view of another embodiment of a shutter blocking mechanism operable to prevent camera operation after the firing of all of the lamps of an attached package.
Figure 4:
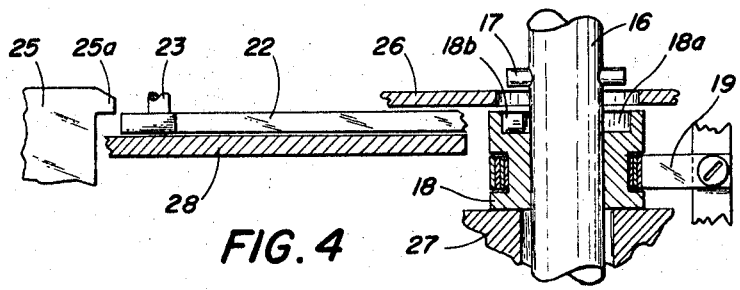
FIG. 4 is a side view of the mechanism shown in FIG. 3.
Figure 5:
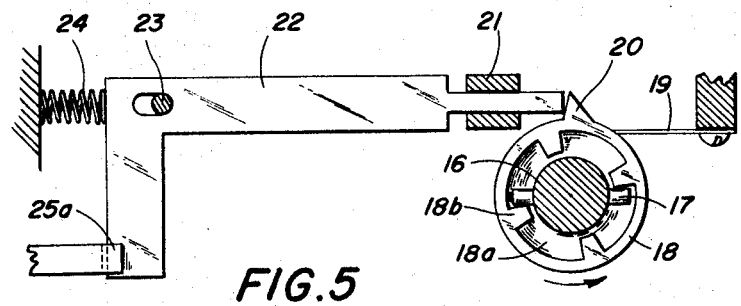
FIG. 5 is a top view showing the mechanism of FIG. 3 in position to block camera operation.
Figure 6:
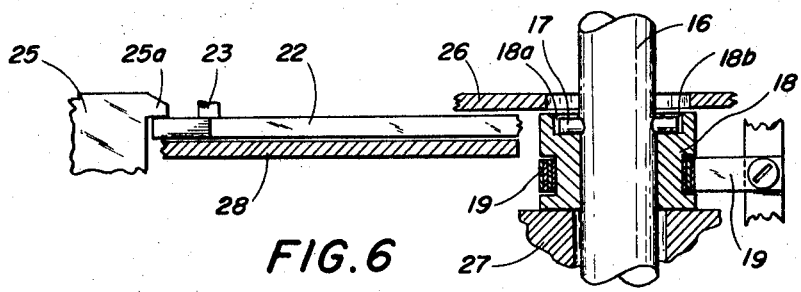
FIG. 6 is a side view of the mechanism as shown in FIG. 5.

A separate blocking lever 6 is mounted for pivotal movement about pin 7 and is urged against a fixed stop 9 in the clockwise direction by a spring force 8. Rotation of the package socket through a complete revolution to fire all of the lamps of of the package causes pin 5 and gear 4 to rotate in the counterclockwise direction as shown, and when gear 4 engages section gear 1, gear 1 is moved to the position shown in the dotted lines in FIG. 1. As shown, the number of teeth on sector gear 1 correspond to the number of teeth on gear 4. When sector gear 1 is in the position shown in dotted lines, a lug 11 on the gear 1 engages an ear 12 on lever 6 to move lever 6 counterclockwise (FIG. 1) against spring force 8 to the position shown in dotted lines. In this position, an extension 13 on the lever 6 is engageable with a tab 14 which forms part of the camera release trigger. In FIG. 1, movement of the release trigger in the direction of the arrow to the position shown at FIG. 1 actuates the shutter mechanism. However, when extension 13 is positioned in the path of movement of tab 14, the release trigger is blocked from movement to its shutter actuating position. Thus, the release trigger cannot move to the shutter actuation position to operate the camera until after the package is removed to disengage gears 1 and 4, thereby permitting gear 1 and lever 6 to return to their original positions.

Referring to the embodiment shown in FIGS. 3 through 6, there is provided a pair of lobes 17 integral with the pin or socket shaft 16, which is moved vertically and rotated in response to the insertion and indexing of a flash package with camera operation. When a package is attached to the socket and the pin 16 is moved downwardly, lobes 17 are arranged to engage a counting cam 18 which is rotatable between surfaces 26, 27 of the camera frame and is urged in a clockwise direction by a spiral spring 19. A lug 20 on the periphery of cam 18 normally engages a stop 21 in a preset rest position. A laterally slidable blocking member 22 is positioned for lateral sliding movement between surfaces 26, 28 along stop 21, which also forms a guide, and pin 23. Member 22 is urged against stop 21 by a compression spring 24. There is also shown a camera operating trigger 25 having an extension 25a, the camera operating button being movable downwardly (FIG. 4) to actuate the camera shutter mechanism.

When a flash package is attached to the receiving socket, pin 16 moves downwardly until lobes 17 enter into a pair of the control spaces 18a of cam 18. As the lamp package, socket and pin 16 are rotated through the full revolution to fire all of the lamps in the package, lobes 17 engage a pair of opposing lugs 18b of the cam 18 to rotate cam 18 in the direction of the arrow in FIG. 5 against the bias of spring 19. Upon complete rotation of pin 16, indicating the firing of all of the flash lamps, cam 18 is moved a full cycle with lug 20 engaging blocking member 22 and moving member 22 against the bias of spring 24 to the position shown in FIG. 5. In this position, blocking member 22 is positioned in the path of movement of the tab 25a on the release trigger 25 (FIG. 6) to prevent trigger 25 from being moved downwardly to a position in which the shutter mechanism can be actuated.

Since prevention of camera operation by blocking trigger 25 signals that all of the lamps of the attached package have been fired, the package may be removed. As the package is removed, pin 16 moves upwardly until lobes 17 are free from engagement with cam 18. Cam 18 is then rotated clockwise by spiral spring 19 to the starting position shown in FIG. 3, and blocking member 22 is returned to its original position to permit shutter actuation.

Referring now to the embodiment shown in FIGS. 7 through 10, there is provided a blocking mechanism which will prevent camera operation by blocking advancement of film in a roll film camera as an indication that all the lamps of an attached package have been fired. In this embodiment, there is shown an outline of the photographic still camera with an accessible roll film advance lever 41 having a curved winding rack to rotate, a film wind gear 42 operatively engaging a film take-up spool. As is also shown in U.S. application Ser. No. 458,015, there is provided a spring 44 which normally urges the winding arm 41 to the position shown in FIG. 7.

According to my invention, there is provided a stop lug 43 on the film advancement lever 41, the lug 43 being engageable by the blocking mechanism to prevent film wind in the manner to be described.

With respect to this embodiment, I provide a vertically movable and rotatable control ring 45 with a projection, the ring and projection normally being urged by a spring force in the direction of the arrow 46 against a fixed stop 47 as shown. Ring 45 is spring urged in the upward position and is movable downwardly in response to attachment of a lamp package by a suitable pin (not shown).

Ring 45 is rotatably supported by a drive part 52 which rotates continuously with the socket, and the pin means shown transmits the rotational motion to ring 45 whenever ring 45 is in its package attachment position (FIG. 9).

There is also provided a locking lever 48 mounted for pivotal movement about a fixed pin 49. Lever 48 is normally urged in the direction of arrow 50 by a spring (not shown) against a stop 51.

Figure 8:
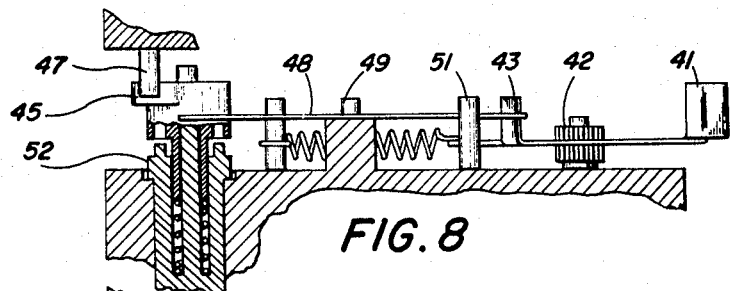

When no package is attached to the socket, the projection of ring 45 is positioned above the lever 48 as shown in FIG. 8. Upon attachment of a multilamp package, ring 45 moves downwardly to the position to engage drive part 52. As the camera is then operated with rotation of the socket and attached package through a revolution cycle in which all of the lamps of the package are fired, the projection on ring 45 engages lever 48 to move lever 48 against its bias until a lug 53 on lever 48 is moved into the path of movement of tab 43 on film advance lever 41 (FIG. 10). In this position, it is apparent that film advance lever 41 may not be operated until the used flash package is removed, thereby causing ring 45 to be moved upwardly to the position shown in FIG. 8. At this time, film wind is possible because lever 48 is permitted by its spring bias to move lug 53 out of the path of movement of tab 43.

Of course, it is also possible to provide ring 45 with an extension having an accessible control knob with which to manually rotate ring 45 clockwise (FIG. 7) to reduce the number of lamps that can be fired. In this instance, the camera operator can select the number of lamps to be fired before operation is blocked.

With reference to FIGS. 11 and 12, there is provided a visible counting mechanism which is usable with or without the embodiments of FIGS. 1 through 10. As such, there is schematically shown a typical viewfinder window 60 within which the signal means may be seen. A vertically movable ejector pin 61 as disclosed above is provided with a gear 62 to rotate a signal wheel 63 having indicia showing the various lamp positions. Rotation is accomplished through a pair of gears 64 and 65 which are always in engagement. Gear 65 and wheel 63, which are on a common axle, are normally biased to the position shown in FIG. 11. Upon attachment of a lamp package to the camera package socket, pin 61 and gear 62 are moved vertically downwardly for engagement of gear 62 with gear 64. As the package and socket are indexed to successively position each of the lamps of the package in the circuit (90° for each indexing step), gear 62 correspondingly causes signal wheel 63 to rotate a one-fifth revolution simultaneously or with each indexing. Radially spaced on signal wheel 63 are five indicia which indicate the number of flash lamps of the inserted package (from zero to four) that have been fired. As shown, mark 66a indicating that one lamp has been fired is moved into a position visible in the viewfinder, and as shown in FIG. 12, 66b showing two used lamps is moved in position. Alternatively, of course, the indicia may be numbers showing the like number of lamps that have been fired.

While the description of my invention is in reference to the particular embodiments shown, it is obvious that various modifications can be resorted to without departing from the spirit of the invention or the scope of the subjoined claims.

I claim:

1. In a camera adapted to receive a photoflash package capable of producing a plurality of flashes and adapted to successively produce each flash in timed relation with shutter actuation, the improvement comprising blocking means operative in response to the use of the last of said plurality of flashes with shutter actuation for preventing further shutter actuation.

2. In a camera adapted to receive a photoflash package capable of producing a plurality of flashes and adapted to successively produce each flash in timed relation with shutter actuation, the improvement comprising blocking means operative in response to the production of a predetermined number of flashes with shutter actuation for preventing further shutter actuation.

3. In a camera adapted to receive a multilamp package having a plurality of flash lamps and adapted to index the package to successively place the flash lamps of the package in a circuit for firing in timed relation with camera operation, the improvement of blocking means operative in response to the firing of a predetermined number of the lamps with camera operation to prevent further camera operation until removal of the package, and having means to actuate a shutter during operation, the blocking means including means to prevent further actuation after the predetermined number of lamps have been fired.

4. In a camera adapted to receive a multilamp package having a plurality of flash lamps and adapted to index the package to successively place the flash lamps of the package in a circuit for firing in timed relation with camera operation, the improvement of blocking means operative in response to the firing of a predetermined number of the lamps with camera operation to prevent further camera operation until removal of the package, and having means to wind roll film after each camera operation, the blocking means including means to prevent further film winding after the predetermined number of lamps have been fired.

5. In a camera adapted to receive a multilamp package having a plurality of flashlamps and adapted to index the package to successively place the flashlamps of the package in a circuit for firing in timed relation with camera operation, the improvement of blocking means operative in response to the firing of a predetermined number of the lamps with camera operation to prevent further camera operation until removal of the package, a mechanism movable during camera operation, the blocking means including a blocking member movable into the path of movement of the mechanism, control means responsive to indexing of the package through a predetermined revolution cycle to move the blocking member into the path of movement of the mechanism, and means responsive to attachment of a package to actuate the control means.

6. In a camera having means to receive a photoflash package comprising a plurality of flash lamps, the improvement of indicator means operative during camera operation for visibly indicating in the camera viewfinder the number of flash lamps fired and including pin means responsive to insertion of a package to actuate the indicator means, said indicator means comprising a rotatable disk having a plurality of indicia corresponding to the number of flash lamps in said package, the indicia being sequentially visible in the camera viewfinder in corresponding relation to the number of sequentially fired flash lamps.

7. In a camera having means to receive a photoflash package capable of producing a plurality of flashes and adapted to successively produce each flash in timed relation with camera operation, the improvement comprising:
  indicator means for visibly indicating in the camera viewfinder the number of flashes which said package has produced,
    said indicator means having an operative condition and an inoperative condition and comprising a movable member having a plurality of indicia thereon corresponding to the plurality of flashes which said package is capable of producing, the indicia being sequentially visible in the camera viewfinder in corresponding relation to the number of flashes which said package has produced, and
  means responsive to insertion of said photoflash package in said camera to place said indicator means in its operative condition.

8. In a camera having means to receive a photoflash package including a plurality of flash lamps, and means for sequentially moving said flash lamps into and out of a lamp firing position, the improvement of indicator means operative during camera operation for visibly indicating in the camera viewfinder the number of flash lamps which have been moved into and out of said position, said indicator means comprising a movable member having a plurality of indicia corresponding to said plurality of flash lamps, the indicia being sequentially visible in the camera viewfinder in corresponding relation to the number of sequentially produced flashes.

References Cited
UNITED STATES PATENTS

| | | | |
|---|---|---|---|
| 2,672,039 | 3/1954 | Schwartz et al. | 240—37 XR |
| 3,080,804 | 3/1963 | Steineck | 95—11.5 |
| 3,096,025 | 7/1963 | Prochnow | 240—1.3 |
| 3,259,043 | 7/1966 | Pagel | 95—11.5 |
| 3,263,068 | 7/1966 | Jakob | 240—1.3 |
| 3,319,547 | 5/1967 | Parsons et al. | 240—1.3 XR |

NORTON ANSHER, *Primary Examiner.*

FRED L. BRAUN, *Assistant Examiner.*

UNITED STATES PATENT OFFICE
CERTIFICATE OF CORRECTION

Patent No. 3,391,621 July 9, 1968

Hubert Nerwin

It is certified that error appears in the above identified patent and that said Letters Patent are hereby corrected as shown below:

Column 5, line 14, before "operation" insert -- camera --; line 15, after "further" insert -- shutter --.

Signed and sealed this 25th day of November 1969.

(SEAL)
Attest:

Edward M. Fletcher, Jr.
Attesting Officer

WILLIAM E. SCHUYLER, JR.
Commissioner of Patents